Oct. 30, 1928.
E. A. ROBINSON
1,689,969
ADJUSTABLE TRAIN PIPE CONNECTER
Filed Oct. 4, 1920    2 Sheets-Sheet 1
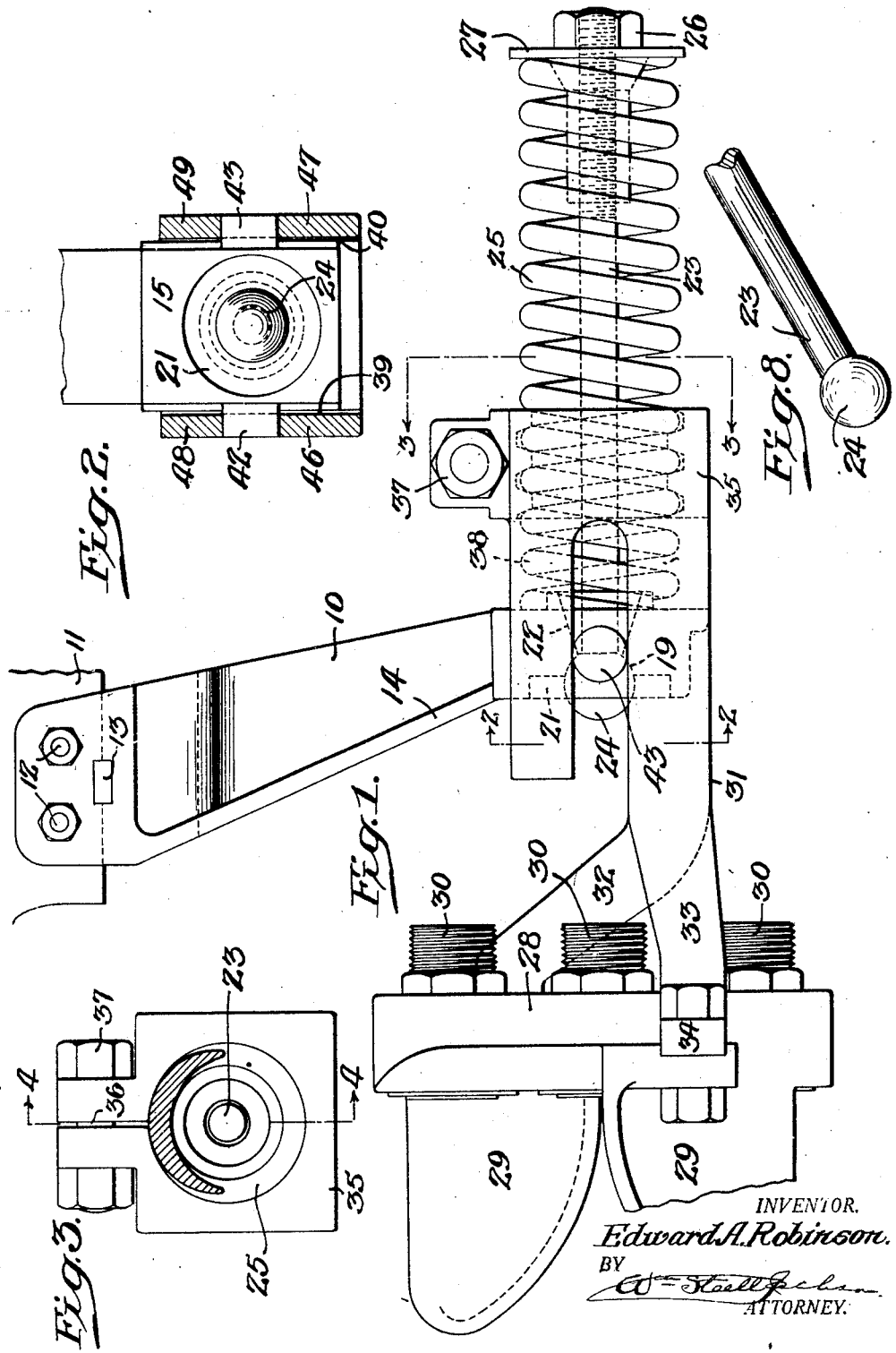
INVENTOR.
Edward A. Robinson.
BY
ATTORNEY.

Oct. 30, 1928.
E. A. ROBINSON
1,689,969
ADJUSTABLE TRAIN PIPE CONNECTER
Filed Oct. 4, 1920     2 Sheets-Sheet 2
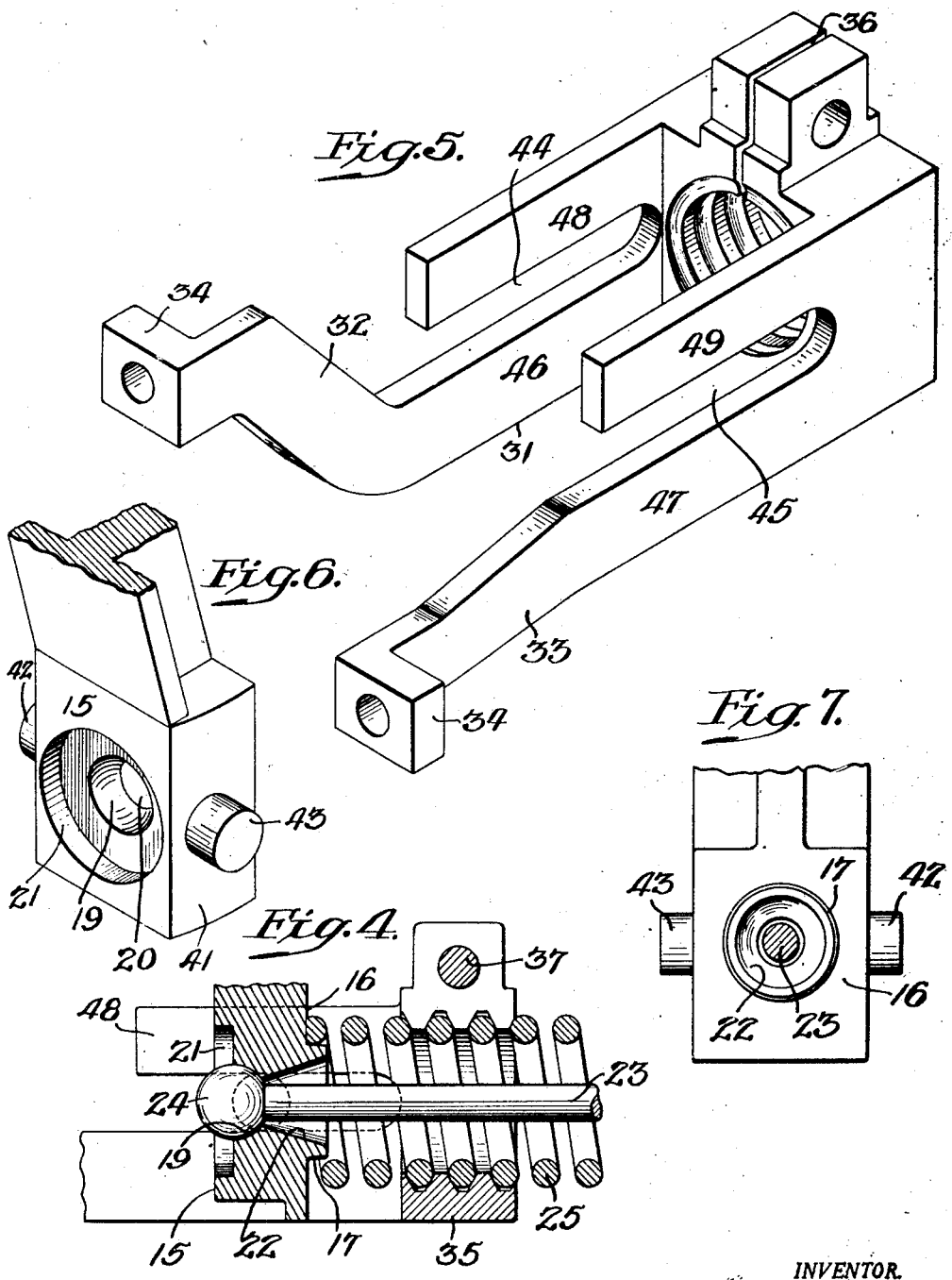
INVENTOR.
Edward A. Robinson
BY
ATTORNEY Patented Oct. 30, 1928.

1,689,969

UNITED STATES PATENT OFFICE.

EDWARD A. ROBINSON, OF MONTREAL, CANADA, ASSIGNOR TO HIMSELF AND ELLISON EDWARD WORKMAN, OF MONTREAL, CANADA.

ADJUSTABLE TRAIN-PIPE CONNECTER.

Application filed October 4, 1920. Serial No. 414,517.

My invention relates to connecters of the type that are used to unite train hose on passenger and freight cars.

The main purpose of my invention is to provide for adjustment of the normal uncoupled position of a train connecter head with respect to the coupling plane.

A further purpose is to provide a connecter which is yieldingly supported back of the bracket and whose buffer spring is adjustable in its position with respect to the head to adjust the plane of the head.

A further purpose is to support the head directly from the buffer spring behind the bracket.

A further purpose is to utilize the end of a buffer spring as the limit of adjustment, mounting the head upon the spring at a short distance from the end for this purpose.

A further purpose is to cushion the forward (retractive) movement of the head which brings the head back to its normal plane in disuse when it is released from engagement with another head.

A further purpose is to mount the head upon a carrier preferably in the form of a yoke which is clamped upon the buffer spring.

A further purpose is to mount the head upon a guide cooperating with the supporting bracket and to provide the guide with an adjustable stop to engage with the rear of the bracket.

A further purpose is to connect the rear of the buffer spring with the bracket by a ball and socket joint and to support the head from the spring.

Further purposes will appear in the specification and in the claims.

I prefer to illustrate my invention by but one form among the many in which it may be presented, selecting a form which is practical, efficient, simple, reliable and inexpensive and which at the same time well illustrates the principles of my invention.

Figure 1 is a side elevation of a connecter and bracket embodying this preferred form of my invention.

Figures 2 and 3 are fragmentary sections of Figure 1 taken upon lines 2—2 and 3—3.

Figure 4 is a section of Figure 3 taken upon line 4—4.

Figure 5 is a perspective view of the carrier for the head in its preferred form as a yoke.

Figure 6 is a fragmentary perspective of the lower end of the mounting bracket.

Figure 7 is a rear end elevation of a portion of the bracket.

Figure 8 is a perspective of the buffer spring tie rod.

In the drawings similar numerals indicate like parts.

In an automatic train pipe connecter, whether for the three hose connections usual for passenger cars or for the one or two hose connections used for freight cars, to all of which my invention is adapted, the desiderata have been considered to be roughly, strength, flexibility, and normal maintenance in position for engagement. Many connecters have been proposed having these features to varying degrees but they have lacked in adjustability to correct for faulty setting, for wear of the connecter parts or of the coupling and for distortion.

Efforts have been made to adjust worn connecter heads and to correct errors in placing of new connecter heads by wedging the bracket forward with respect to the car member to which it is attached. These have been unsuccessful, both because the range of adjustment is insufficient and because the cant or tilt thus given to the face of the connecter is objectionable.

My invention is designed to secure the longitudinal adjustment which these prior workers ignored or attempted disadvantageously and also to support the head resiliently in a predetermined plane with great flexibility of movement about a center far enough back from the head to give the head a predetermined proper radius of movement, to provide equal flexibility in all planes, to make the adjustment of the plane of the front face of the head by accessible and reliable means located behind the supporting bracket and to cushion the return or replacing movement of the head, preferably by the same buffer spring which is used to take the compression incident to engagement of the mating heads.

Describing the construction shown by way of illustration and not in limitation: The bracket 10 is used to support the connecter parts from a relatively fixed car member such as the coupling 11 to which it is bolted as at 12 in the usual manner and in which the lost motion is taken up as by wedge 13. The bracket is sloped rearwardly and its position is selected with a view to giving any predetermined spacing between the face of the head and the pivotal point about which the head turns.

My bracket is flanged along one edge as at 14 to give additional strength and rigidity to the block 15 at its lower end.

This block is provided with a seat, rest or stop 16 at the rear for a cooperating structure which moves with the head. As the cooperating member in the present case is a spring, the seat is made to receive the front face of the spring and this face is preferably ground to a plane transverse to the axis of the spring. To prevent side movement an annular shoulder 17 is formed coaxial with the spring about the middle of the seat and preferably inside the spring to fit the spring; and the shoulder is tapered to guide the end of the spring into this seat.

At the front of the block a hemi-spherical socket 19 is formed within which the head lies. It is provided with an aperture in the center at 20. In the illustration the socket 19 is placed within an annular recess 21 resulting in the placing of the socket more nearly in the center of the block than would otherwise be the case, but this is not necessary and in some cases would not be desirable.

The portion of the block in front of the opening 20 is flared in truncated cone form at 22 in order to give side play to the rod 23 whose ball head 24 fits the socket.

The block is made wider at the rear than at the front in order to give clearance to permit turning of the parts at curves.

The front end of the spring 25 rests against the seat 16 in normal position of disuse of the connecter and is tightly pressed against it by means of the tie-rod 23 and a tubular tie-rod nut 26 which is flanged at 27 to engage with the spring.

The head 28 is provided with the usual horns 29 and terminals 30 for hose connections. Three are here shown, corresponding in number and position to the connections for passenger cars. They are shown conventionally as my present invention has nothing to do with the character of the hose connections, and any type of these, old or new, may be used with the head.

The head is mounted upon a carrier 31 which is illustrated as in the form of a yoke having legs 32 and 33, turned at their ends at 34 where they are secured to the head back of the respective horns by any fastenings, such as bolts.

At the rear the legs connect with a mount, here illustrated as a clamp 35 in the form of a coupling, split at 36 and tightened by bolt 37 to grip the spring 25. To insure better gripping contact, the clamp is internally threaded to correspond in pitch with the spring 25. It may correspond in interior contour with the said spring or as shown, may have acme standard threads to pinch the spring at the sides or other wedging threads as desired, with the purpose and intent that the spring may be threaded through the clamp to project forwardly through the other end of the clamp to any desired extent and may be clamped in adjusted position by the tightening of bolt 37 or by other suitable gripping or clamping action.

As shown in Figure 1, the portion 38 of the spring projecting in advance of the clamp rests upon the seat 16 and determines the extent of projection of the head in advance of the bracket—representing any fixed car portion—so that further screwing of the spring through the clamp will draw the head rearwardly and unscrewing of the spring to withdraw it rearwardly will project the head forwardly. Not only can adjustment be made to any desired total extent, but fine graduations of adjustment can be secured by small angular adjustment of the spring within the clamp; with the result that both major and minor adjustments of the position of the head may be obtained to any maximum corresponding in forward position with the engagement of the clamp with the rear face of the bracket block.

Not only does this forwardly projecting portion of the spring afford adjustment and a stop for the retractive return movement of the head after it has been pressed back by the cooperating head of another car, but this portion 38 of the buffer spring acts also as a cushion to take up the jar of this retractive head movement, reducing the shock upon the bracket and increasing the life of the device.

As will be seen the clamp 35 and consequently the head 27 swing with the spring in any direction about the center of the spherical head 24 and to any extent permitted by the sides of the conical opening 22.

In order to guide retractive movement of the head under the influence of the spring against improper lateral movement, the back of the block 15 is given a width nearly equal to the spacing between the inner facing surfaces 39 and 40 of the legs 32 and 33 at the rear, but the sides of the block are tapered, curved or otherwise reduced, as at 41, so as to permit turning of the carrier to accommodate the curves in the track.

Vertical turning of the carrier, here shown as a yoke, is provided for at the same time that guidance of retractive movement of the spring in this direction also is insured, by guides 42 and 43 upon the sides of the block fitting within the slots 44 and 45, which are formed between the rear portions 46 and 47 of the legs and forwardly projecting prongs 48 and 49. As I prefer to stagger the feet 34 of the legs to opposite sides of the head, the position of the rear ends 46 and 47 of the legs requires that one of them shall be bent downwardly and rearwardly from its point of fastening to the head, as at 50.

Because of the inward movement of the prongs when the clamp 35 is tightened they must be spaced initially to a sufficient extent to give additional clearance so as to avoid binding of the head between them when the clamp is set.

The lateral fitting of the block between the legs, and the slot and pin guides to direct retractive movement of the clamp and spring, reseating the end of the spring after it has been pressed rearwardly by engagement of the head with an opposing head, secure a positiveness and reliability of operation difficult of attainment where dependence is placed upon the tension of the spring.

The head is mounted upon the spring at an intermediate point giving resilient movement in any direction even without movement of the tie rod. As thus mounted, it is free to rock upon the spring as stated and also to swing as the spring swings.

In assemblage, the bracket is placed in position and the carrier, with or without the head mounted upon it, is clamped upon the spring. The tie rod is placed in position and the carrier and spring are then passed over the tie-rod and guide pins from the rear until the front end of the spring is seated against the rear of the bracket. The tie-rod is then tightened to give the required degree of compression to the buffer spring.

In case of necessity for adjustment, the extent of adjustment is measured in comparison with the pitch of the spring. The tie-rod nut is relaxed and the clamp of the carrier loosened, after which the spring is screwed through the clamp to an extent proportionate to the part of the pitch represented by the adjustment required. The tie rod is then tightened as before.

For example, with a spring having an inch relaxed pitch a quarter inch adjustment of the head would require a trifle more than a quarter of a turn of the spring within the clamp to take care of the reduction in pitch due to the compression of the spring.

I do not claim herein the forked yoke with internally screw threaded clamp as this broadly forms a part of the subject matter of a copending application filed by me for automatic train pipe connecters, Serial No. 355,948, filed February 3, 1920.

It will be evident that my disclosure in the structure shown will suggest to others skilled in the art a variety of forms in which the invention may be carried out, differing because of the training, needs or whim of the individual, and I purpose including herein all such variations as come within the spirit and scope of my invention.

Having thus described my invention, what I claim as new and desire to secure by Letters Patent is:

1. In an automatic train connecter, a head, train pipe terminals carried thereby, a carrier rigidly mounted with respect to the head, a bracket adapted to be secured to a fixed car member, a buffer spring back of the bracket, a tie rod holding the buffer spring and a fastening rigid with the carrier and tightly engaging the spring to move with the spring.

2. In an automatic connecter, a bracket adapted for engagement with a fixed car member having a seat at the bottom facing toward the rear thereof, a tie rod pivotally engaging said bracket, a spring adapted for compression by the tie rod and engaging the seat and a head mounted firmly upon the spring and carried by it.

3. In an automatic connecter, a bracket adapted for engagement with a fixed car member and having a seat at the bottom facing toward the rear thereof, a tie rod pivotally engaging said bracket, a spring adapted for compression by the tie rod and engaging the seat, a head and a mount for the head terminating in a clamp adapted firmly to engage the spring to carry the head from the spring.

4. In an automatic connecter, a bracket adapted for engagement with a fixed car member and having a seat at the bottom facing toward the rear thereof, a tie rod pivotally engaging said bracket, a spring adapted for compression by the tie rod and engaging the seat, a head, a carrier for the head and a clamp for the carrier adapted for adjustable mounting of the head upon the spring to vary the extent of projection of the head in front of the bracket.

5. In an automatic connecter, a bracket adapted for engagement with a fixed car member and having a seat at the bottom facing toward the rear thereof, a tie rod pivotally engaging said bracket, a spring adapted for compression by the tie rod and engaging the seat, a head, a carrier for the head and a clamp rigid with the carrier adapted to engage the spring at an intermediate point and resiliently support the head from the spring at a point back of the front face of the spring.

6. In an automatic connecter, a bracket adapted for engagement with a fixed car member and having a seat at the bottom facing toward the rear thereof, a tie rod pivotally engaging said bracket, a spring adapted for compression by the tie rod and engaging the seat, a head, a support for the head connected thereto, a clamp carried by the head and adapted to firmly engage the spring and cooperating guiding mechanism between the support and bracket whereby the head is permitted to swing with respect to the bracket.

7. In an automatic connecter, a bracket adapted for engagement with a fixed car member and having a seat at the bottom facing toward the rear thereof, a tie rod pivotally engaging said bracket, a spring adapted for compression by the tie rod and engaging the seat, a head, a yoke rigidly connected to the head and having guiding slots therein, a clamp carried by the yoke and adapted to mount the yoke upon the spring and guides carried by the bracket cooperating with the guiding slots of the yoke.

8. In an automatic connecter, a bracket adapted for engagement with a fixed car member and having a seat at the bottom facing toward the rear thereof, a spring engaging said seat and a head resiliently mounted upon the spring and having a resilient buffer between the mount and the bracket removed from engagement with the bracket in use of the head and relieving the jar of the mount against the bracket when the head is projected by the spring.

9. In an automatic connecter, a bracket adapted for engagement with a fixed car member and having a seat at the bottom facing toward the rear thereof, a buffer spring and tie rod connected therewith, a head mounted upon the spring and spacing means between the mount and the bracket adjustable to vary the forward extension of the head.

10. In an automatic connecter, a bracket adapted for engagement with a fixed car member and having a seat at the bottom facing toward the rear thereof, a buffer spring carried by the bracket and a head mounted upon the spring and adjustable at a point behind the bracket to vary the extension of the head.

11. In an automatic connecter, a bracket adapted for engagement with a fixed car member and having a seat at the bottom facing toward the rear thereof, a buffer spring carried by the bracket, a head and a mount for the head upon the spring adjustable in its position to vary the extent of projection of the head.

12. In an automatic connecter, a bracket adapted for engagement with a fixed car member, a buffer spring carried by the bracket at the rear thereof and a head mounted as a nut upon the buffer spring.

13. In an automatic connecter, a bracket adapted for engagement with a fixed car member, a buffer spring carried by the bracket at the rear thereof and a head mounted as a nut upon the buffer spring and adapted to be clamped upon the spring at adjustable distances behind the bracket.

14. In an automatic connecter, a bracket adapted for engagement with a fixed car member, a head located in advance of the bracket, a yoke connected with the head and extending around the bracket, a spring engaging with the rear of the bracket, and supporting the rear portion of the yoke, a buffer spring behind the yoke and a tie rod connecting the lower end of the bracket and the buffer spring.

15. In an automatic connecter, a bracket adapted for engagement with a fixed car member, a buffer spring and tie rod connected with the bracket and a head mounted upon the buffer spring at a point intermediate the ends of said spring.

16. In an automatic connecter, a bracket adapted for engagement with a fixed car member, a buffer spring and tie rod connected pivotally with the bracket and a head mounted upon the buffer spring at a point intermediate the ends of said spring and adapted to swing with the rod and spring.

17. In an automatic connecter, a bracket adapted for engagement with a fixed car member, a buffer spring seated against the rear of the bracket and extending rearwardly therefrom and a tie rod support from the bracket for the other end of the spring.

EDWARD A. ROBINSON.